A. W. WESSOLECK.
SPEEDOMETER.
APPLICATION FILED MAY 9, 1918.
1,290,443.
Patented Jan. 7, 1919.
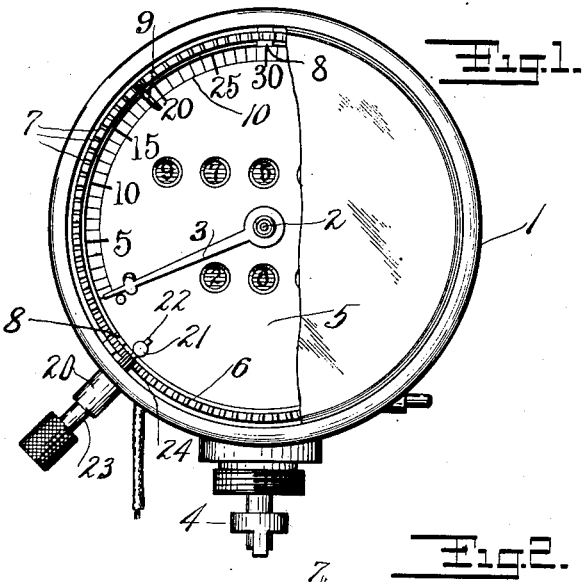
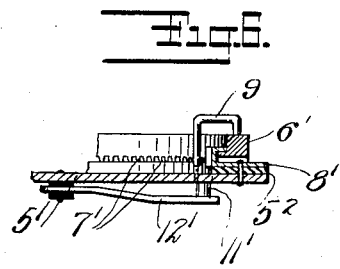
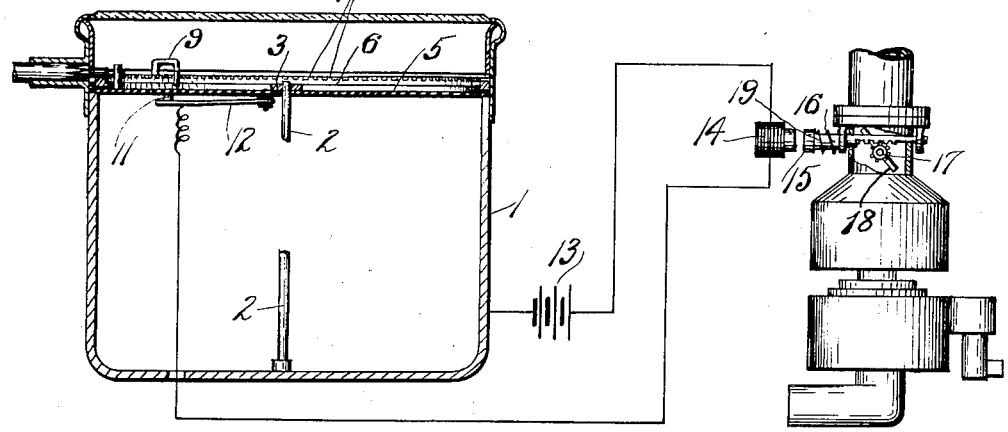
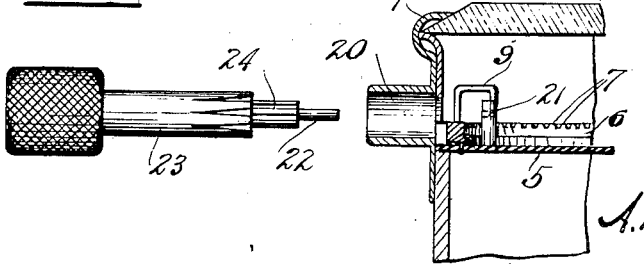
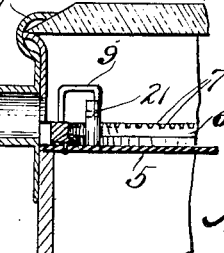
A. W. Wessoleck
Inventor
By his Attorneys
Bartlett & Brownell

UNITED STATES PATENT OFFICE.

AUGUSTUS W. WESSOLECK, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

SPEEDOMETER.

1,290,443.      Specification of Letters Patent.      Patented Jan. 7, 1919.

Application filed May 9, 1918. Serial No. 233,425.

*To all whom it may concern:*

Be it known that I, AUGUSTUS W. WESSOLECK, a citizen of the United States, residing at New Britain, county of Hartford, State of Connecticut, have invented a certain new and useful Improvement in Speedometers, of which the following is a full, clear, and exact description.

My invention relates to speedometers and has for its object to provide a speedometer which will automatically shut off the power of a motor or internal combustion engine when the speed reaches a predetermined point. It also has for its object to provide a speedometer which can be adjusted as to the limiting point and be substantially proof against resetting by unauthorized persons.

It further has for its object to provide such speedometer with a new and improved adjustable contact carrier and means for adjusting the same.

The following is a description of a speedometer embodying my invention, reference being had to the accompanying drawings, in which:

Figure 1 is a plan of a speedometer embodying my invention;

Fig. 2 is a view of the same partly in side elevation and partly in section in connection with a circuit and a throttle controlled thereby;

Fig. 3 is an enlarged detail of the setting means;

Fig. 4 is an enlarged sectional view of a portion of the speedometer;

Fig. 5 is an enlarged detail showing the toothed ring and bearing for the inner end of the setting spindle, and Fig. 6 shows a modification of certain details.

Referring more particularly to the drawings, 1 is a speedometer casing; 2 is a shaft mounted therein and carrying a speed indication pointer, or responsive contact 3, the shaft being actuated by any suitable means so that its angular movement corresponds to the speed of the flexible shaft connection 4, which drives the speed responsive mechanism. 5 is a dial made of insulating material. 6 is a metallic ring provided with teeth 7 and held to the dial by clips 8 secured to the dial. 9 is a contact carried by the ring 6 and lying in the path of the pointer 3 so that it may be engaged thereby.

The dial has a scale 10 thereon indicating the speed in miles per hour for any given position of the pointer. 11 is a brush carried by the dial and held against the lower surface of the ring 6 by a spring 12 secured to the dial. This brush is connected to a circuit which contains a source of current 13 and an electromagnet 14, and has its other end connected to the casing 1 so that the magnet and battery are in series with the pointer 3 and the contact 9, and the circuit therethrough is completed when the pointer 3 engages the contact 9.

The magnet 14 acts upon an armature 15 which, when actuated by the magnet, controls the motor. In the embodiment shown it actuates a rack 16 engaging a gear 17 connected to a throttle 18 controlling the fuel supply of an internal combustion engine so as to close the throttle and cut off the supply. A spring 19 tends to restore the throttle to open position.

The casing is provided with an opening 20 opposite a bearing 21 into which the end 22 of a spindle 23, having a gear 24, can be inserted so that the gear will be in engagement with the teeth 7 of the ring gear 6. Turning the spindle will move the ring 6 so that the contact 9 can be set at any position along the scale on the dial. The spindle can then be removed whereupon the contact is virtually fixed against re-setting by unauthorized persons not provided with a similar spindle. The spindle being controllable by the authorized person enables the speed of the vehicle to be controlled by that person.

In the modification the dial 5' is made of metal and the ring 6' is separated therefrom by an insulating ring 5², carrying clips 8' and secured to the dial. The brush 11' and spring 12' are also insulated from the metallic dial. With this construction the speed limiting means can be applied to speedometers having metallic dials without substitution of a non-conducting dial.

In using this speedometer with internal combustion engines for controlling the fuel supply the throttle is provided with the electromagnet and rack, connections being made with a suitable source of current and with the spring 12 and casing 1 of the speedometer. The contact 9 is then adjusted to the desired maximum speed by the geared spindle 23 and the spindle removed. The chauffeur is thereupon prevented from driving his motor above a given speed, since, if the speed rises so as to cause the pointer 3 to engage the contact 9, the magnet 14 becomes energized so as to close the throttle 18 and cut off the fuel supply.

The nature of the device actuated by the electromagnet device for controlling the motor depends upon the kind of motor employed and upon the manner of control desired. Where an internal combustion engine is employed I prefer to control the power through the fuel supply rather than by short circuiting the ignition, since by so doing the discharge manifold and muffler do not become filled with an explosive mixture when the power is shut off so as to be liable to have the contents suddenly ignited with undesired results.

As will be evident to those skilled in the art, my invention permits of various applications and modifications without departing from the spirit thereof or the scope of the appended claims.

What I claim is:

1. In a speedometer having a casing, the combination of a movable contact responsive to variations in speed, a dial in connection with which said contact indicates such variations by an angular movement about the center of said dial, a ring carried by said dial and secured thereto at points adjacent to its periphery so as to be movable about the center of said dial, a contact carried by said ring and insulated from said speed responsive contact, conducting terminals electrically connected to said two contacts respectively, and controllable means for rotating said ring and adjusting the contact carried thereby about the axis of rotation of said movable contact.

2. In a speedometer having a casing, the combination of a movable contact responsive to variations in speed, a dial, a toothed ring movably mounted within said casing and adjacent to the periphery of said dial, a contact carried by said ring and insulated from said speed-responsive contact, conducting terminals electrically connected to said two contacts respectively, and a removable geared spindle insertible through said casing so as to engage the teeth on said ring.

3. In a speedometer having a casing, the combination of a movable contact responsive to variations in speed, a dial, a toothed ring movably mounted within said casing and adjacent to the periphery of said dial, a contact carried by said ring and insulated from said speed-responsive contact, conducting terminals electrically connected to said two contacts respectively, a removable geared spindle insertible through said casing so as to engage the teeth on said ring, and a bearing for the inner end of said spindle carried by said dial.

AUGUSTUS W. WESSOLECK.